(12) United States Patent
Balachandran et al.

(10) Patent No.: US 7,142,580 B1
(45) Date of Patent: Nov. 28, 2006

(54) SYSTEMS, METHODS, AND COMPUTER PROGRAM PRODUCTS FOR PROVIDING TRAFFIC FREQUENCY DIVERSIFICATION IN A CELLULAR COMMUNICATION SYSTEM

(75) Inventors: Kumar Balachandran, Cary, NC (US); Rajaram Ramesh, Cary, NC (US)

(73) Assignee: Ericsson, Inc., Research Triangle Park, NC (US)

( * ) Notice: Subject to any disclaimer, the term of this patent is extended or adjusted under 35 U.S.C. 154(b) by 1122 days.

(21) Appl. No.: 09/695,357

(22) Filed: Oct. 24, 2000

(51) Int. Cl.
*H04B 1/713* (2006.01)

(52) U.S. Cl. .................................................. 375/132

(58) Field of Classification Search ................ 375/132, 375/219, 220, 133, 134; 370/328, 319, 344, 370/343, 337, 347; 455/450, 452.1, 422.1, 455/12.1, 13.1, 13.2
See application file for complete search history.

(56) References Cited

U.S. PATENT DOCUMENTS

| | | | |
|---|---|---|---|
| 5,570,352 A | | 10/1996 | Pöyhönen .................... 370/18 |
| 5,828,693 A | * | 10/1998 | Mays et al. ................. 375/136 |
| 6,011,786 A | * | 1/2000 | Dent ........................... 370/330 |
| 6,256,486 B1 | * | 7/2001 | Barany et al. ............... 455/296 |
| 6,298,081 B1 | * | 10/2001 | Almgren et al. ............ 375/132 |
| 6,366,622 B1 | * | 4/2002 | Brown et al. ............... 375/322 |
| 6,597,927 B1 | * | 7/2003 | Eswara et al. .............. 370/334 |

FOREIGN PATENT DOCUMENTS

| EP | 0917305 A2 | 5/1999 |
|---|---|---|
| WO | WO96/07284 | 3/1996 |
| WO | WO98/28859 | 7/1998 |

OTHER PUBLICATIONS

Näslund et al. "An Evolution of GSM," *1994 44th IEEE Vehicular Technology Conference*, Stockholm, Sweden, Jun. 8-10, 1994, pp. 348-352.
Copy of International Search Report for PCT/US01/42497, Aug. 27, 2002.
*Concept Proposal for GPRS-136HS Edge, Revision 1.4*, ETSI STC SMG2, Agenda Item 6.2, Bordeaux, France, Sep. 20-24, 1999, 31 pp.

(Continued)

*Primary Examiner*—Pankaj Kumar
(74) *Attorney, Agent, or Firm*—Myers Bigel Sibley & Sajovec, PA

(57) ABSTRACT

A mobile terminal and a base station subsystem may communicate by assigning a primary or control frequency to the cell in which the mobile terminal is located and using that control frequency to exchange control information between the mobile terminal and the base station subsystem. The exchange of control information in the cell is constrained to the primary or control frequency. In addition, a plurality of traffic frequencies may be assigned to the cell and used to exchange traffic information between the mobile terminal and the base station subsystem using coordinated frequency hopping. Multi-path fading experienced on diverse, non-contiguous traffic frequency bands may be uncorrelated between the respective bands. Consequently, a code-word carried over a plurality of non-contiguous frequencies may be more likely to experience random, uncorrelated fading, which may improve the signal to noise ratio (SNR) of the signal and, as a result, improve network performance.

39 Claims, 11 Drawing Sheets

OTHER PUBLICATIONS

*Concept Proposal for GPRS-136HS, Revision 1.0*, ETSI SMG2 Working Session on EDGE, Agenda Item 6.4, Stockholm, Sweden, Jun. 21-23, 1999, 23 pp.

Furuskär et al., EDGE: *Enhanced Data Rates for GSM and TDMA/136 Evolution*, IEEE Personal Communications, V. 6, No. 3, Jun. 1999, pp. 56-66.

*Digital Cellular Telecommunications Systems (Phase 2+); General Packet Radio Service (GPRS); Service Description; Stage 2 (GSM 03.60 Version 5.2.0)*, European Telecommunications Standards Institute, 1997, 96 pp.

\* cited by examiner

FIG. 8A

|      | RLC Block | | | | RLC Block | | | |
|------|---|---|---|---|---|---|---|---|
|      | 0 | 1 | 2 | 3 | 0 | 1 | 2 | 3 |
| Frame | 0 | 1 | 2 | 3 | 4 | 5 | 6 | 7 |
| Slot 0 | f1 | f1 | f1 | f1 | f1 | f1 | f1 | f1 |
| 1 | f1 | f4 | f7 | f10 | f1 | f4 | f7 | f10 |
| 2 | f1 | f4 | f7 | f10 | f1 | f4 | f7 | f10 |
| 3 | f1 | f4 | f7 | f10 | f1 | f4 | f7 | f10 |
| 4 | f1 | f4 | f7 | f10 | f1 | f4 | f7 | f10 |
| 5 | f1 | f4 | f7 | f10 | f1 | f4 | f7 | f10 |
| 6 | f1 | f4 | f7 | f10 | f1 | f4 | f7 | f10 |
| 7 | f1 | f4 | f7 | f10 | f1 | f4 | f7 | f10 |

Cell A

FIG. 8B

|      | RLC Block | | | | RLC Block | | | |
|------|---|---|---|---|---|---|---|---|
|      | 0 | 1 | 2 | 3 | 0 | 1 | 2 | 3 |
| Frame | 0 | 1 | 2 | 3 | 4 | 5 | 6 | 7 |
| Slot 0 | f4 | f4 | f4 | f4 | f4 | f4 | f4 | f4 |
| 1 | f4 | f7 | f10 | f1 | f4 | f7 | f10 | f1 |
| 2 | f4 | f7 | f10 | f1 | f4 | f7 | f10 | f1 |
| 3 | f4 | f7 | f10 | f1 | f4 | f7 | f10 | f1 |
| 4 | f4 | f7 | f10 | f1 | f4 | f7 | f10 | f1 |
| 5 | f4 | f7 | f10 | f1 | f4 | f7 | f10 | f1 |
| 6 | f4 | f7 | f10 | f1 | f4 | f7 | f10 | f1 |
| 7 | f4 | f7 | f10 | f1 | f4 | f7 | f10 | f1 |

Cell B

Cell C

| Slot \ Frame | RLC Block 0 | | | | RLC Block 1 | | | |
|---|---|---|---|---|---|---|---|---|
| | 0 | 1 | 2 | 3 | 0 | 1 | 2 | 3 |
| | 0 | 1 | 2 | 3 | 4 | 5 | 6 | 7 |
| 0 | f7 | f7 | f7 | f7 | f7 | f7 | f7 | f7 |
| 1 | f7 | f10 | f1 | f4 | f7 | f10 | f1 | f4 |
| 2 | f7 | f10 | f1 | f4 | f7 | f10 | f1 | f4 |
| 3 | f7 | f10 | f1 | f4 | f7 | f10 | f1 | f4 |
| 4 | f7 | f10 | f1 | f4 | f7 | f10 | f1 | f4 |
| 5 | f7 | f10 | f1 | f4 | f7 | f10 | f1 | f4 |
| 6 | f7 | f10 | f1 | f4 | f7 | f10 | f1 | f4 |
| 7 | f7 | f10 | f1 | f4 | f7 | f10 | f1 | f4 |

FIG. 8C

Cell D

| Slot \ Frame | RLC Block 0 | | | | RLC Block 1 | | | |
|---|---|---|---|---|---|---|---|---|
| | 0 | 1 | 2 | 3 | 0 | 1 | 2 | 3 |
| | 0 | 1 | 2 | 3 | 4 | 5 | 6 | 7 |
| 0 | f10 | f10 | f10 | f10 | f10 | f10 | f10 | f10 |
| 1 | f10 | | | | f10 | | | |
| 2 | f10 | f1 | f4 | f7 | f10 | f1 | f4 | f7 |
| 3 | f10 | f1 | f4 | f7 | f10 | f1 | f4 | f7 |
| 4 | f10 | f1 | f4 | f7 | f10 | f1 | f4 | f7 |
| 5 | f10 | f1 | f4 | f7 | f10 | f1 | f4 | f7 |
| 6 | f10 | f1 | f4 | f7 | f10 | f1 | f4 | f7 |
| 7 | f10 | | | | f10 | | | f7 |

FIG. 8D

Cell E

| Slot \ Frame | RLC Block 0 | | | | RLC Block | | | |
|---|---|---|---|---|---|---|---|---|
| | 0 | 1 | 2 | 3 | 0 | 1 | 2 | 3 |
| | 0 | 1 | 2 | 3 | 4 | 5 | 6 | 7 |
| 0 | f2 | f6 | f10 | f2 | f6 | f10 | f2 | f6 |
| 1 | f2 | f6 | f10 | f2 | f6 | f10 | f2 | f6 |
| 2 | f2 | f6 | f10 | f2 | f6 | f10 | f2 | f6 |
| 3 | f2 | f6 | f10 | f2 | f6 | f10 | f2 | f6 |
| 4 | f2 | f6 | f10 | f2 | f6 | f10 | f2 | f6 |
| 5 | f2 | f6 | f10 | f2 | f6 | f10 | f2 | f6 |
| 6 | f2 | f6 | f10 | f2 | f6 | f10 | f2 | f6 |
| 7 | f2 | f6 | f10 | f2 | f6 | f10 | f2 | f6 |

*FIG. 13A*

Cell F

| Slot \ Frame | RLC Block 0 | | | | RLC Block | | | |
|---|---|---|---|---|---|---|---|---|
| | 0 | 1 | 2 | 3 | 0 | 1 | 2 | 3 |
| | 0 | 1 | 2 | 3 | 4 | 5 | 6 | 7 |
| 0 | f6 | f10 | f2 | f6 | f10 | f2 | f6 | f10 |
| 1 | f6 | f10 | f2 | f6 | f10 | f2 | f6 | f10 |
| 2 | f6 | f10 | f2 | f6 | f10 | f2 | f6 | f10 |
| 3 | f6 | f10 | f2 | f6 | f10 | f2 | f6 | f10 |
| 4 | f6 | f10 | f2 | f6 | f10 | f2 | f6 | f10 |
| 5 | f6 | f10 | f2 | f6 | f10 | f2 | f6 | f10 |
| 6 | f6 | f10 | f2 | f6 | f10 | f2 | f6 | f10 |
| 7 | f6 | f10 | f2 | f6 | f10 | f2 | f6 | f10 |

*FIG. 13B*

Cell G

| Slot \ Frame | RLC Block 0 | | | | RLC Block | | | |
|---|---|---|---|---|---|---|---|---|
| | 0 | 1 | 2 | 3 | 0 | 1 | 2 | 3 |
| | 0 | 1 | 2 | 3 | 4 | 5 | 6 | 7 |
| 0 | f10 | f2 | f6 | f10 | f2 | f6 | f10 | f2 |
| 1 | f10 | f2 | f6 | f10 | f2 | f6 | f10 | f2 |
| 2 | f10 | f2 | f6 | f10 | f2 | f6 | f10 | f2 |
| 3 | f10 | f2 | f6 | f10 | f2 | f6 | f10 | f2 |
| 4 | f10 | f2 | f6 | f10 | f2 | f6 | f10 | f2 |
| 5 | f10 | f2 | f6 | f10 | f2 | f6 | f10 | f2 |
| 6 | f10 | f2 | f6 | f10 | f2 | f6 | f10 | f2 |
| 7 | f10 | f2 | f6 | f10 | f2 | f6 | f10 | f2 |

*FIG. 13C*

SYSTEMS, METHODS, AND COMPUTER PROGRAM PRODUCTS FOR PROVIDING TRAFFIC FREQUENCY DIVERSIFICATION IN A CELLULAR COMMUNICATION SYSTEM

BACKGROUND OF THE INVENTION

The present invention relates generally to the field of cellular communication systems, and, more particularly, to cellular communication systems that use time division multiple access (TDMA) technology, such as those based on the Telecommunication Industry Association (TIA)/Electronic Industries Association (EIA)/American National Standards Institute (ANSI) 136 standard or the global system for mobile communication (GSM) standard.

Wireless communications systems are commonly used to provide voice and data communications to subscribers. For example, analog cellular radiotelephone systems have long been deployed successfully throughout the world. Digital cellular radiotelephone systems, such as those conforming to the North American TIA interim standard (IS) 54 and the European standard GSM have been in service since the early 1990's. More recently, a wide variety of wireless digital services have been introduced, which are broadly labeled as PCS (Personal Communications Services), and include advanced digital cellular systems conforming to standards such as ANSI-136 and IS-95, lower-power systems such as DECT (Digital Enhanced Cordless Telephone), and data communications services such as CDPD (Cellular Digital Packet Data). These and other systems are described in The Mobile Communications Handbook, edited by Gibson and published by CRC Press (1996).

FIG. 1 is a high-level block diagram of a conventional GSM network 20. The GSM network includes a base station subsystem 22 that communicates with a mobile terminal 24 using a radio link protocol. The base station subsystem 22 may also communicate with a Serving Generalized Packet Radio Service (GPRS) Support Node (SGSN) 26 and a Mobile Switching Center (MSC) 28. The SGSN 26 may access an external packet data network 32 via a Gateway GPRS Support Node (GGSN) 34. The MSC 28 typically functions as a conventional switching node in the Public Switched Telephone network (PSTN)/Integrated Services Data Network (ISDN) 36. The SGSN 26 and the MSC 28 may be coupled to each other and may also access a pair of databases known as the Home Location Register (HLR) 38 and the Visitor Location Register (VLR) 42.

The base station subsystem 22 may comprise a base station controller and one or more base transceiver stations. A base transceiver station contains the radio transceiver that defines an individual cell in the GSM network and communicates with mobile terminals in the cell using a radio-link protocol. The base station controller is generally used to manage resources for one or more base station transceivers. These resource management duties may include radio-channel setup, frequency hopping, and hand-offs of mobile terminals between cells.

GSM provides both circuit switched data services and packet switched data services. Packet switched data services are provided through a GSM protocol known as GPRS. The base station subsystem 22 may communicate with the SGSN 26 for packet switched and/or circuit switched data connections. Conversely, the base station subsystem 22 may communicate with the MSC 28 for voice connections.

The MSC 28 and the SGSN 26 may provide the functionality used to service the mobile terminal 24 along with other mobile terminals in the GSM network. In particular, the MSC 28 and SGSN 26 may provide registration, authentication, location updating, hand-offs, and call routing services to roaming subscribers. To provide these services, the MSC 28 and SGSN 26 may access information stored in the HLR 38 and the VLR 42 databases.

For example, the HLR 38 typically contains administrative information associated with subscriber's registered in the GSM network along with the current locations of the subscribers' mobile terminals. The location of a mobile terminal may be represented as the signaling address of the VLR 42 associated with the mobile terminal. The VLR 42 typically contains selected administrative information from the HLR 38 for mobile terminals that are currently located in the geographical region controlled by the VLR 42. Accordingly, the MSC 28, SGSN 26, HLR 38, and VLR 42 may cooperate to provide call routing and roaming functionality for the GSM network.

As end-user services move towards mobile multimedia, a new technology, known as Enhanced Data Rates for Global Evolution (EDGE), may be used in GSM networks to boost network capacity and increase data rates. EDGE may increase data rates for circuit switched connections via an Enhanced Circuit Switched Data (ECSD) mode and for packet switched connections via an Enhanced Generalized Packet Radio Service (EGPRS) mode up to three-fold. Moreover, because EDGE is built on the existing GSM standard and uses the same TDMA frame structure, EDGE service may typically be introduced into a GSM network via a software/firmware retrofit of the base station subsystem 22 and introduction of EDGE compatible mobile terminals.

SUMMARY OF THE INVENTION

According to embodiments of the present invention, a mobile terminal and a base station subsystem (e.g., a base transceiver station and a base station controller) may communicate by assigning a primary or control frequency to the cell in which the mobile terminal is located and then using that control frequency to exchange control information between the mobile terminal and the base station subsystem. The exchange of control information in the cell is constrained to the primary or control frequency. In addition, a plurality of traffic frequencies may be assigned to the cell and used to exchange traffic information between the mobile terminal and the base station subsystem using coordinated frequency hopping.

BRIEF DESCRIPTION OF THE DRAWINGS

Other features of the present invention will be more readily understood from the following detailed description of specific embodiments thereof when read in conjunction with the accompanying drawings, in which:

FIGS. 8A–8D are frequency assignment charts based on time slot and frame for four cells shown in the cellular network of FIG. 7 in accordance with an embodiment of the present invention;

FIGS. 13A–13C are frequency assignment charts based on time slot and frame for three cells shown in the cellular network of FIG. 12 in accordance with an embodiment of the present invention.

DETAILED DESCRIPTION OF THE INVENTION

Figure 1:
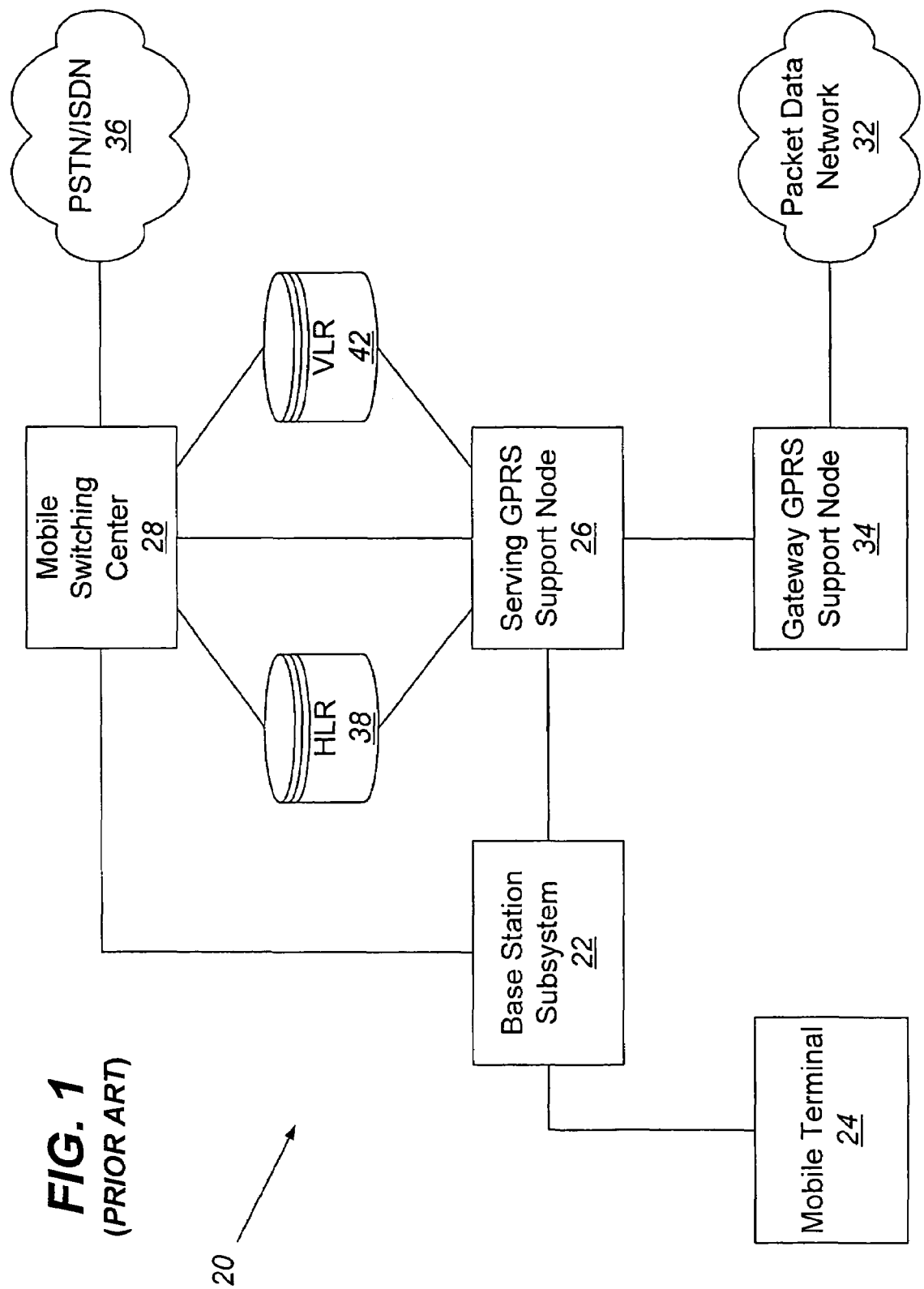
FIG. 1 is a block diagram that illustrates a conventional GSM cellular network.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

The present invention is described herein in the context of a mobile terminal. As used herein, the term "mobile terminal" may include a cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

In addition, the present invention is described herein in the context of a GSM/EDGE cellular communication system. While the present invention may be particularly useful for improving the performance of GSM/EDGE cellular networks, it should be understood that the principles of the present invention may be applied to any cellular or wireless system that uses TDMA technology, which includes hybrid systems that combine code division multiple access (CDMA) technology and/or frequency division multiple access (FDMA) technology with TDMA. Accordingly, a mobile terminal, in accordance with the present invention, may be designed to communicate with a base station transceiver using the GSM standard, the ANSI-136 standard, or any other wireless communication standard that is based on TDMA.

The present invention may be embodied as cellular communication systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Figure 2:
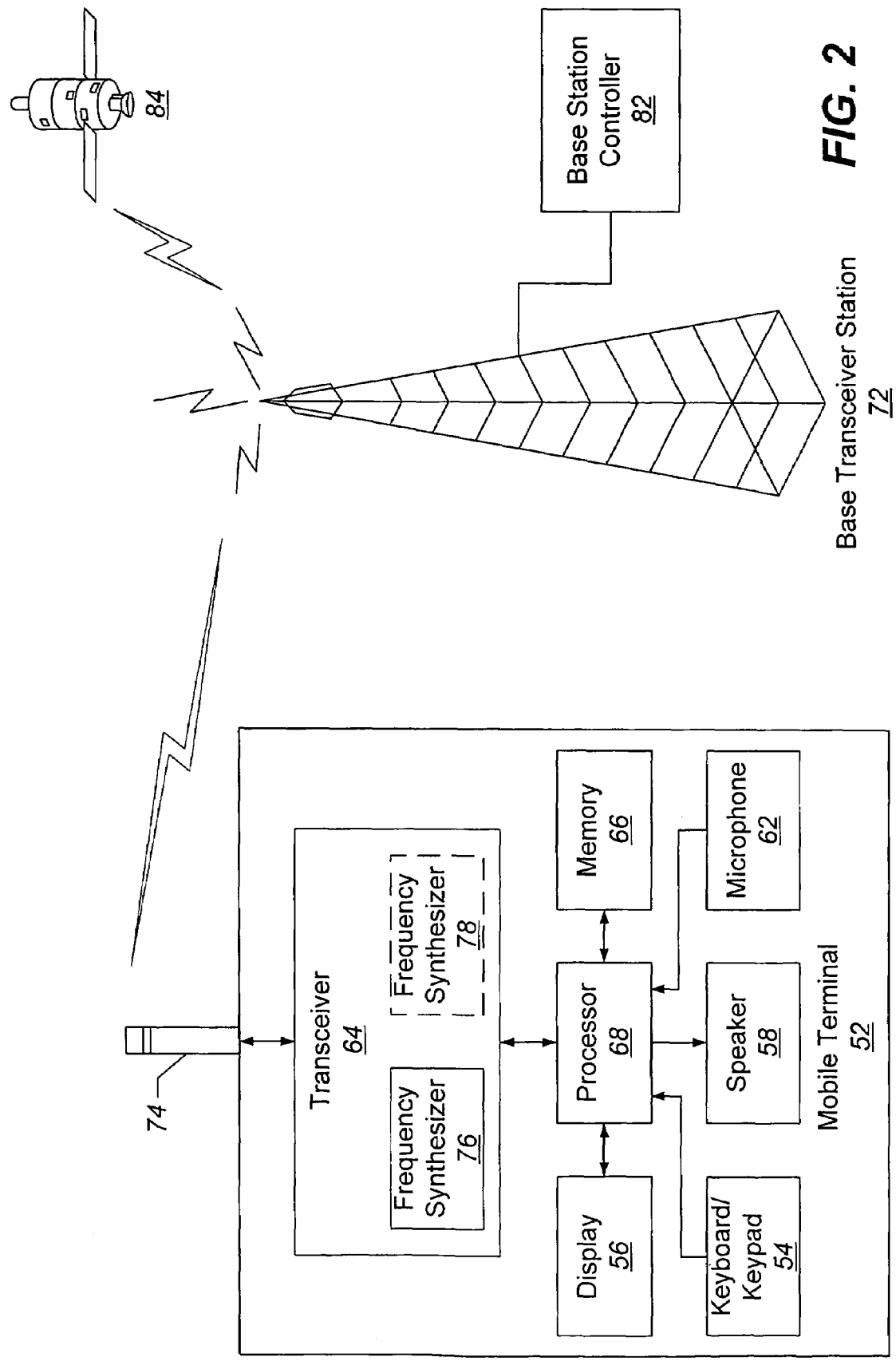
FIG. 2 is a high-level diagram of an exemplary cellular communication system that illustrates cellular communication systems, methods, and computer program products in accordance with the present invention.

Referring now to FIG. 2, a mobile terminal 52 suitable for use with the present invention may include a keyboard/keypad 54, a display 56, a speaker 58, a microphone 62, a transceiver 64, and a memory 66 that communicate with a processor 68. The transceiver 64 receives incoming radio frequency signals from a base transceiver station 72 and transmits outgoing radio frequency signals to the base transceiver station 72 via an antenna 74. The transceiver typically comprises at least one frequency synthesizer 76 and may comprise a second frequency synthesizer 78 as will be discussed in greater detail hereinafter. The radio frequency signals transmitted between the mobile terminal 52 and the base transceiver station 72 may comprise both traffic and control signals (e.g., paging signals/messages for incoming calls), which are used to establish and maintain communication with another party or destination. The foregoing components of the mobile terminal 52 may be included in many conventional mobile terminals and their functionality is generally known to those skilled in the art.

The base transceiver station 72 contains the radio transceivers that define an individual cell in the cellular network and communicate with the mobile terminal 52 and other mobile terminals in the cell using a radio-link protocol. The base transceiver station 72 also maintains a connection with a base station controller 82, which is generally used to manage resources for one or more base transceiver stations.

These resource management duties may include radio-channel setup, frequency hopping, and hand-offs of mobile terminals between cells. Together, the base transceiver station 72 and the base station controller 82 comprise a base station subsystem. Finally, the base transceiver station 72 may maintain a communication link with a satellite communication system 84, such as the global positioning system (GPS), which may be used for purposes of timing and synchronization as will be discussed in greater detail hereinafter. It should be understood that a base transceiver station 72 facility (i.e., tower) may contain multiple radio transceivers and directional antennas, which may be used to define multiple cells in a cellular network. As used herein, the base transceiver station 72 represents at least one radio transceiver that is assigned to a single cell.

Figure 3:
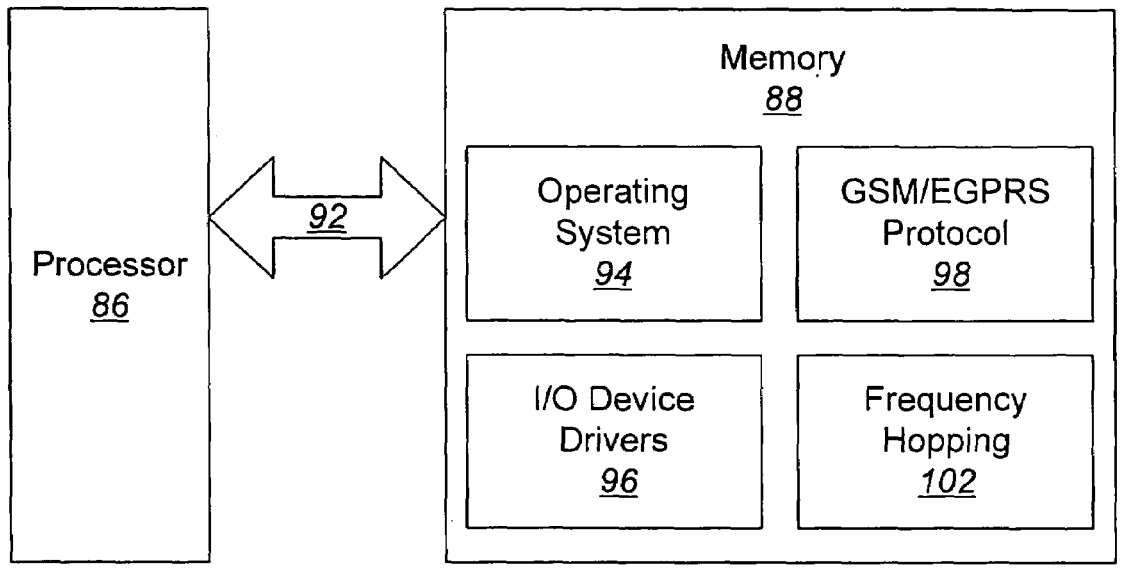
FIG. 3 is a block diagram that illustrates a processor and memory that may be used in a mobile terminal shown in FIG. 2 in accordance with an embodiment of the present invention.

FIG. 3 illustrates a processor 86 and memory 88, which may be used in the mobile terminal 52 of FIG. 2. The processor 86 communicates with the memory 88 via an address/data bus 92. The processor 86 may be, for example, a commercially available or custom microprocessor suitable for an embedded application. The memory 88 is representative of the overall hierarchy of memory devices containing the software and data used to implement the functionality of the mobile terminal 52. The memory 88 may include, but is not limited to, the following types of devices: cache, ROM, PROM, EPROM, EEPROM, flash, SRAM, and DRAM.

As shown in FIG. 3, the memory 88 may hold four major categories of software and data used in the mobile terminal 40: the operating system 94; the input/output (I/O) device drivers 96; the GSM/EGPRS protocol program module 98; and the frequency hopping program module 102. The I/O device drivers 96 typically include software routines accessed through the operating system 94 to communicate with devices such as the keyboard/keypad 54, display 56, speaker 58, microphone 62, and certain memory 88 components.

The GSM/EGPRS protocol program module 98 may comprise programs for implementing the GSM/EGPRS protocol stack on the mobile terminal 52. The frequency hopping program module 102 may comprise programs for processing a frequency hopping sequence that is received from the base transceiver station 72 and programs for tuning the frequency synthesizers 76 and 78 to the frequencies defined in the hopping sequence at appropriate times to maintain communication with the base transceiver station 72.

Figure 4:
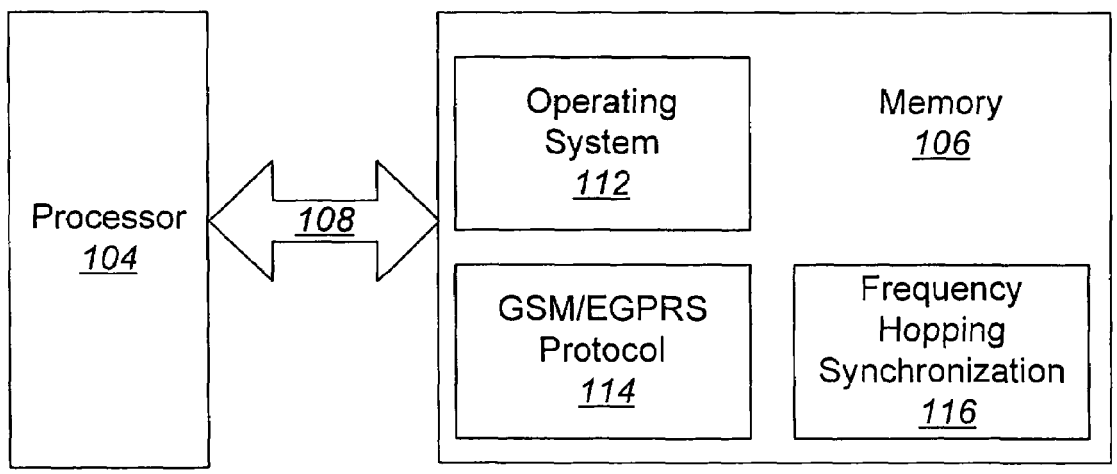
FIG. 4 is a block diagram that illustrates a processor and memory that may be used in a base transceiver station shown in FIG. 2 in accordance with an embodiment of the present invention.

FIG. 4 illustrates a processor 104 and a memory 106, which may be used in the base transceiver station 72 of FIG. 2. The processor 104 communicates with the memory 106 via an address/data bus 108. The processor 104 may be, for example, a commercially available or custom microprocessor suitable for an embedded application. The memory 106 is representative of the overall hierarchy of memory devices containing the software and data used to implement the functionality of the base transceiver station 72. The memory 106 may include, but is not limited to, the following types of devices: cache, ROM, PROM, EPROM, EEPROM, flash, SRAM, and DRAM.

As shown in FIG. 4, the memory 106 may hold three major categories of software and data used in the base transceiver station 72: the operating system 112; the GSM/EGPRS protocol program module 114; and the frequency hopping synchronization program module 116. The GSM/EGPRS protocol program module 114 may comprise programs for implementing the GSM/EGPRS protocol stack on the base transceiver station 72. The frequency hopping synchronization program module 116 may comprise programs for tuning the transceivers in the base transceiver station 72 to the frequencies defined in the hopping sequence. Moreover, the frequency hopping synchronization program module 116 may comprise programs for maintaining proper synchronization with other base transceiver stations in the GSM cellular network through communication with, for example, the GPS satellite 84.

Figure 5:
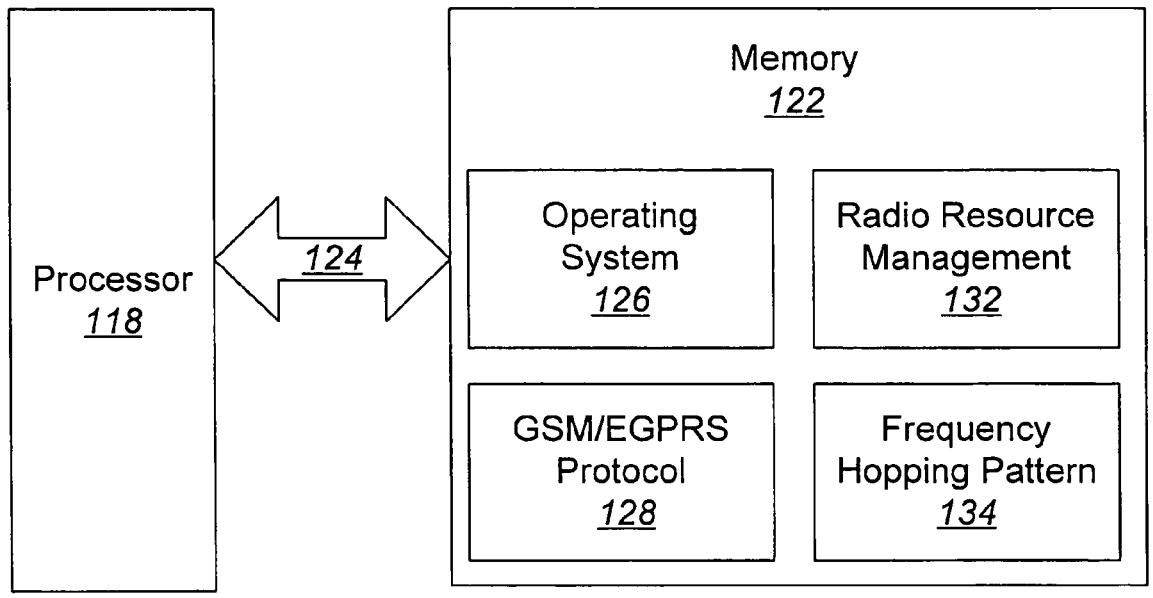
FIG. 5 is a block diagram that illustrates a processor and memory that may be used in a base station controller shown in FIG. 2 in accordance with an embodiment of the present invention.

FIG. 5 illustrates a processor 118 and a memory 122, which may be used in the base station controller 82 of FIG. 2. The processor 118 communicates with the memory 122 via an address/data bus 124. The processor 118 may be, for example, a commercially available or custom microprocessor suitable for an embedded application. The memory 122 is representative of the overall hierarchy of memory devices containing the software and data used to implement the functionality of the base station controller 82. The memory 122 may include, but is not limited to, the following types of devices: cache, ROM, PROM, EPROM, EEPROM, flash, SRAM, and DRAM.

As shown in FIG. 5, the memory 122 may hold four major categories of software and data used in the base station controller 82: the operating system 126; the GSM/EGPRS protocol program module 128; the radio resource management program module 132, and the frequency hopping pattern program module 134. The GSM/EGPRS protocol program module 128 may comprise programs for implementing the GSM/EGPRS protocol stack on the base station controller 82. The radio resource management program module 132 may comprise programs for managing radio resources for the base transceiver station 72 and any other base transceiver stations under the control of the base station controller 82. Accordingly, the radio resource management program module 132 may provide such functions as radio-channel setup, frequency hopping, and hand-offs of mobile terminals between cells. The frequency hopping pattern program module 134 may comprise programs for maintaining frequency hopping patterns for cells under the control of the base station controller 82 and for communicating these hopping patterns to mobile terminals through the base transceiver stations associated with these cells.

Computer program code for carrying out operations of the respective program modules associated with the mobile terminal 52, the base transceiver station 72, and the base station controller 82 is preferably written in a high-level programming language, such as C or C++, for development convenience. Nevertheless, some modules or routines may be written in assembly language or even micro-code to enhance performance and/or memory usage. While the frequency hopping synchronization program module 116 is shown to reside on the base transceiver station 72 and the frequency hopping pattern program module 134 is shown to reside on the base station controller 82, program code from each of these modules may also execute partly on the base transceiver station 72 and partly on the base station controller 82 or entirely on either the base transceiver station 72 or the base station controller 82.

As will be further appreciated by those skilled in the art, the functionality of the frequency hopping program module 102, the frequency hopping synchronization program module 116, and the frequency hopping pattern program module 134 may also be implemented using discrete hardware components, a single application specific integrated circuit (ASIC), or a programmed digital signal processor or microcontroller.

As discussed hereinabove, EDGE technology may provide relatively poor performance in the delivery of real-time services, such as voice. One factor that tends to degrade the performance of EDGE networks and other wireless communication networks is multi-path fading of the radio signals transmitted between the mobile terminals and the base transceiver stations. One type of multi-path fading is known as flat fading, which may arise from the interaction of a transmitted signal (the main ray) with reflected versions of the transmitted signal that arrive concurrently at a receiver. Time dispersion, another type of fading, may arise from interaction of the main ray with time-delayed reflections of the main ray.

In accordance with the present invention, a code-word in an EDGE network may be encoded over a plurality of non-contiguous frequencies. In general, the fading experienced on diverse, non-contiguous frequency bands is uncorrelated between the respective bands. Consequently, a code-word carried over a plurality of non-contiguous frequencies may be more likely to experience random, uncorrelated fading, which may improve the signal to noise ratio (SNR) of the signal and, as a result, improve network performance. The foregoing principles will be illustrated hereafter by way of example with reference to an EDGE network. Recall, however, that the present invention may be used in any wireless or cellular network that uses TDMA technology.

Figure 6:
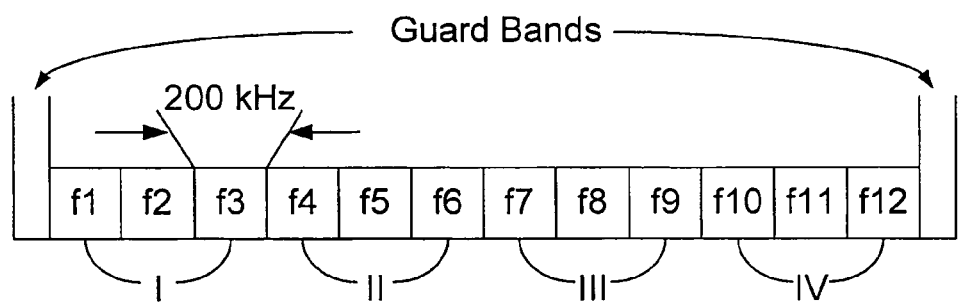
FIG. 6 is a frequency distribution diagram that illustrates an exemplary bandwidth allocation in accordance with an embodiment of the present invention.

An exemplary frequency distribution diagram for deploying EDGE service in 2.4 MHz of bandwidth is shown in FIG. 6. The frequency spectrum is divided into twelve, 200 kHz sub-bands, which are respectively centered at frequencies f1 through f12. A pair of guard bands provides separation between the EDGE deployment and other services using the neighboring frequency spectrum. It should be understood that the EDGE bandwidth may alternatively be divided into more than twelve sub-bands. In this case, each of the frequencies f1 through f12 would represent an equivalence class of frequencies (i.e., a plurality of frequencies that may be used interchangeably) rather than a single frequency.

Figure 7:
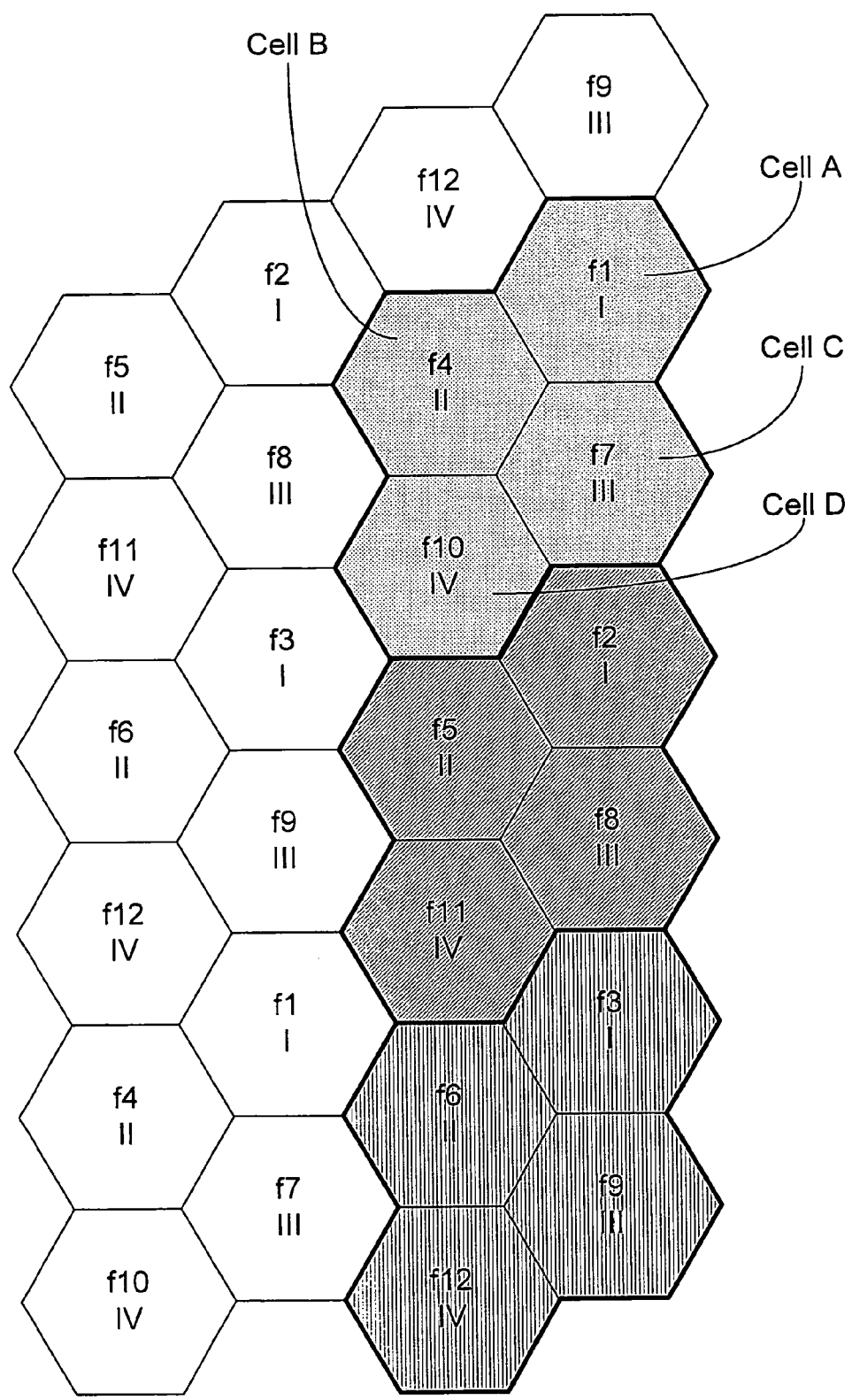
FIG. 7 is a block diagram that illustrates a cellular network in which the frequencies shown in FIG. 6 have been assigned to respective cells in accordance with an embodiment of the present invention.

The frequencies f1 through f12 are arranged into four groups of three contiguous frequencies as denoted by the Roman numerals I through IV. By selecting a single frequency from each of the four groups, the primary frequencies may be assigned to cells in a GSM/EDGE cellular network using a 4/12 (i.e., three groups of four frequencies) reuse pattern as shown in FIG. 7. Each cell in the network is labeled with a primary frequency and the Roman numeral corresponding to that frequency's group assignment in FIG. 6. The three groups of four frequencies that are reused throughout the network are highlighted by three different background shade patterns.

The primary frequency assignment for each of the cells in the GSM/EDGE cellular network may be engineered by the network operator and communicated to the base transceiver station 72 and the mobile terminal 52 via the base station controller 82. In embodiments of the present invention, the primary frequency in each cell may also be called the control frequency because the Packet Broadcast Control Channel (PBCCH) and the Packet Common Control Channel (PCCCH) are always transmitted on this frequency.

Recall, however, that, in accordance with the present invention, a frequency hopping pattern may be defined for a cell, which is maintained in the frequency hopping pattern program module 134 in the base station controller 82. These hopping patterns may be provided to the respective base transceiver stations, which are equipped with a frequency hopping synchronization program module 116 to transmit the patterns to the mobile terminals. Preferably, the hopping pattern is transmitted using the PBCCH, which is defined by the primary/control frequency and one or more time slots. Thus, although control information is exchanged between the mobile terminal 52 and the base transceiver station 72 solely on the primary/control frequency assigned to the cell, traffic information may be exchanged between the mobile terminal 52 and the base transceiver station 72 using a plurality of traffic frequencies as illustrated in FIGS. 8A–8D.

FIGS. 8A–8D are frequency assignment charts based on time slot and frame for four Cells A through D shown in the cellular network of FIG. 7 and that illustrate exemplary frequency hopping patterns for the cells according to an embodiment of the invention. First, note that for all four Cells A through D, time slot zero is always assigned to the primary/control frequency and serves as a control time slot for communication of the control channels PBCCH and PCCCH. The remaining time slots comprise traffic time slots and may be used for exchanging traffic information between the mobile terminal 52 and the base transceiver station 72. Referring now to FIG. 8A, the mobile terminal 52 in Cell A uses frequency f1 in frame zero, frequency f4 in frame one, frequency f7 in frame two, and frequency f10 in frame three to exchange traffic information on time slots one through seven. The pattern is cyclical as it repeats in frames four through seven. Cells B and C follow similar patterns with the four primary/control frequencies assigned to the four cells in a particular reuse group being rotated between the cells in cyclical fashion Data is generally encoded over one Radio Link Control (RLC)/Medium Access Control (MAC) block and interleaved within the block. An RLC/MAC block comprises four time slots spanning four frames as shown in FIGS. 8A–8D. A code-word is, therefore, encoded over a plurality of non-contiguous traffic frequencies. Advantageously, using a different traffic frequency in each frame of an RLC/MAC block may ensure decorrelation of the fading seen in the four time slots and, further, may reduce the variance of the instantaneous carrier to interference ratio (C/I) by bringing it closer to the average C/I of the channel. As a result, error performance may be sufficiently improved so that real-time services, such as voice, may be delivered over an EDGE network in a more efficient manner.

As shown in FIGS. 8A–8D, the traffic frequency hopping pattern is cyclical; however, the hopping pattern may be random among the four primary/control frequencies respectively assigned to Cells A through D. Furthermore, if the frequencies f1 through f12 represent equivalence classes of frequencies, the hopping pattern may be defined by making a random selection of a frequency belonging to the equivalence class that the primary frequency $fi$, i=1–12, represents.

Referring again to FIG. 2, the base transceiver station 72 is preferably equipped with two frequency synthesizers or two transceivers to allow for quick frequency transitions between adjacent time slots. For example, the frequency hopping synchronization program module 116 of the base transceiver station 72 may tune the spare transceiver or frequency synthesizer to the next frequency in the sequence before the time slot for that frequency arrives. When the time slot arrives, the frequency hopping synchronization program module 116 may make the spare frequency synthesizer or transceiver active and switch the previously active frequency synthesizer or transceiver to a standby or spare mode to be tuned to the next frequency in the sequence. This may allow for rapid changes between frequencies as is illustrated in FIG. 8A beginning at frame 1, time slot 7 through frame 2, time slot I where the base transceiver station 72 and the mobile terminal 52 change frequencies twice over a span of three time slots.

If the mobile terminal 52 is equipped with dual frequency synthesizers 76 and 78 as shown in FIG. 2, then the frequency hopping program module 102 may operate the two transceivers in active and standby mode as discussed in the foregoing with respect to the dual frequency synthesizers or transceivers in the base transceiver station 72. If, however, the mobile terminal 52 is not equipped with two frequency synthesizers (e.g., frequency synthesizer 78 is not included), then the frequency hopping program module 102 and the frequency hopping synchronization program module 116 may coordinate the transitions between frequencies to ensure that at least one idle time slot is inserted between time slots associated with different frequencies as shown in FIG. 8D (a blank time slot is an idle time slot). These idle time slots may allow the frequency hopping program module 102 to tune the frequency synthesizer 76 to the next frequency in the hopping sequence.

The various base transceiver stations in the GSM/EDGE network are preferably synchronized to coordinate frequency hopping among the network cells. One possible approach to uniform synchronization is to use the frequency hopping synchronization program module 116 in the base transceiver station 72 to communicate with the GPS satellite 84 to obtain a common time base by which frame and time slot boundaries may be defined.

Finally, it is envisioned that the frequency hopping synchronization program module 116 of the base transceiver station 72 in cooperation with the frequency hopping pattern program module 134 of the base station controller 82 may periodically change the group identity of a cell. For example, as shown in FIG. 7, Cells A–D belong to a frequency reuse group that have been assigned primary/control frequencies f1, f4, f7, and f10. In accordance with the present invention, Cells A–D may be assigned a new group identity such that their primary/control frequencies are replaced with the primary/control frequencies from another frequency reuse group. Thus, Cell A may have frequency f2 assigned as an alternative primary/control frequency, Cell B, may have frequency f5 assigned as an alternative primary/control frequency, Cell C may have frequency f8 assigned as an alternative primary/control frequency, and Cell D may have frequency f1 assigned as an alternative primary/control frequency. These new frequencies may then be used as part of a traffic frequency hopping pattern as discussed in the foregoing.

Figure 9:
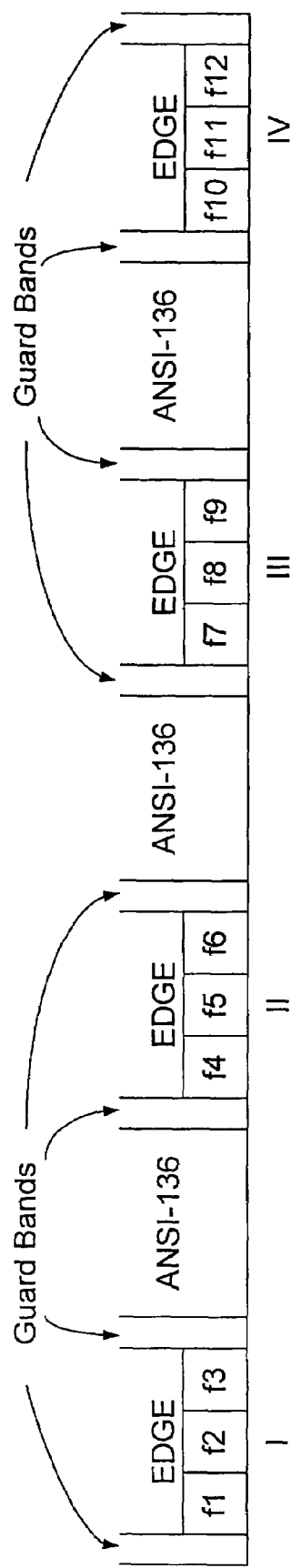
FIG. 9 is a frequency distribution diagram that illustrates an exemplary bandwidth allocation in accordance with an embodiment of the present invention.

Referring now to FIG. 9, the exemplary EDGE deployment illustrated in FIG. 6 may be modified to coexist with an auxiliary cellular communication system, such as ANSI-136, in the same bandwidth. In this embodiment, an ANSI-136 sub-band is interleaved between each of the four EDGE frequency groups identified in FIG. 6, such that the four frequencies assigned to a given frequency reuse group are non-contiguous and each separated by at least one of the ANSI-136 sub-bands. Advantageously, this frequency distribution increases the total EDGE communication bandwidth with respect to the coherence bandwidth to increase the likelihood that fading between the EDGE carrier frequencies is uncorrelated. One drawback to this frequency distribution, however, is the consumption of additional frequency spectrum for guard bands to separate the EDGE sub-bands from the ANSI-136 sub-bands.

Figure 10:
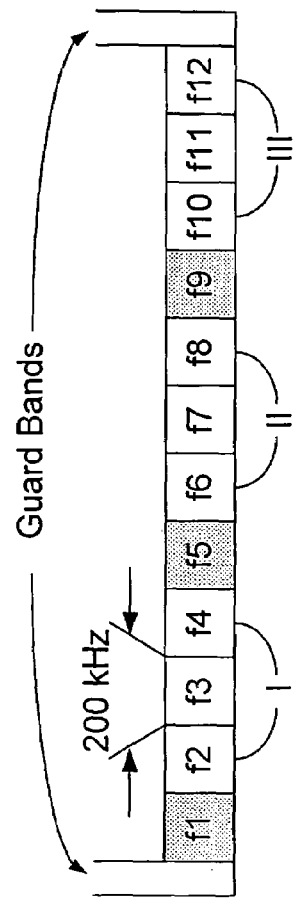
FIG. 10 is a frequency distribution diagram that illustrates an exemplary bandwidth allocation in accordance with an embodiment of the present invention.
Figure 11:
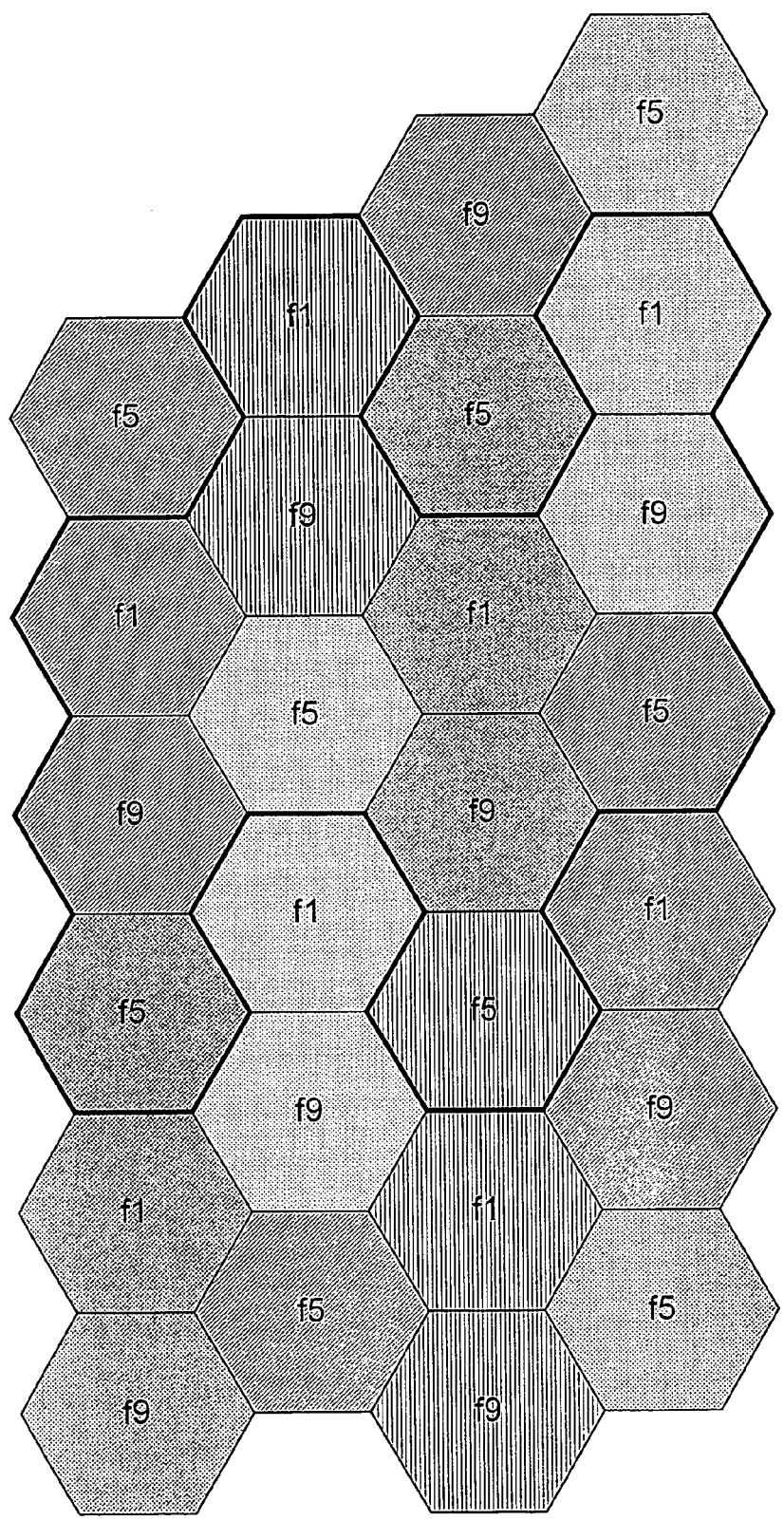
FIG. 11 is a block diagram that illustrates a cellular network in which the control frequencies shown in FIG. 10 have been assigned to respective cells in accordance with an embodiment of the present invention.

FIG. 10 is an exemplary frequency distribution diagram for deploying EDGE service in 2.4 MHz of bandwidth in accordance with an alternative embodiment of the present invention. In particular, this embodiment makes use of the EDGE Compact Air-Interface Mode that may provide greater spectral efficiencies through a lower spectral reuse pattern. EDGE Compact may be deployed in 600 kHz by isolating three carriers that are used in a 1/3 reuse pattern. In the FIG. 10 example, frequencies f1, f5, and f9 are selected for an EDGE Compact deployment. While these three frequencies are deployed in a 1/3 reuse pattern as shown in FIG. 11, the EDGE Compact standard takes advantage of the synchronization of the base transceiver stations serving the various cells in the GSM/EDGE network to create time-groups for the three EDGE Compact frequencies. In accordance with the EDGE Compact Standard, communication of control signaling (i.e., PBCCH and PCCCH signaling) between a mobile terminal and a base transceiver station is only allowed during the time group assigned to the cell. Accordingly, when a first time group is active (i.e., cells assigned to the first time group are allowed to communicate control information) cells belong to other time groups are idle (i.e., no communication between the mobile terminals and the base transceiver stations). By using four time groups as represented by the four different shading patterns shown in FIG. 11, a 4/12 effective reuse may be obtained for communicating control information. Note, however, that the time groups are not used in accordance with traffic channels, which means that traffic information is communicated using 1/3 frequency reuse of the three EDGE Compact frequencies with the condition that the traffic channels are not allowed to overlap in time with any of the control channels.

The remaining nine frequencies shown in FIG. 10 may be deployed using 3/9 frequency reuse and used solely for traffic communication. The deployment of the nine traffic frequencies may be overlaid onto the EDGE Compact deployment of FIG. 11 as shown in FIG. 12 where the three reuse traffic frequency groups are outlined in bold.

Figure 12:
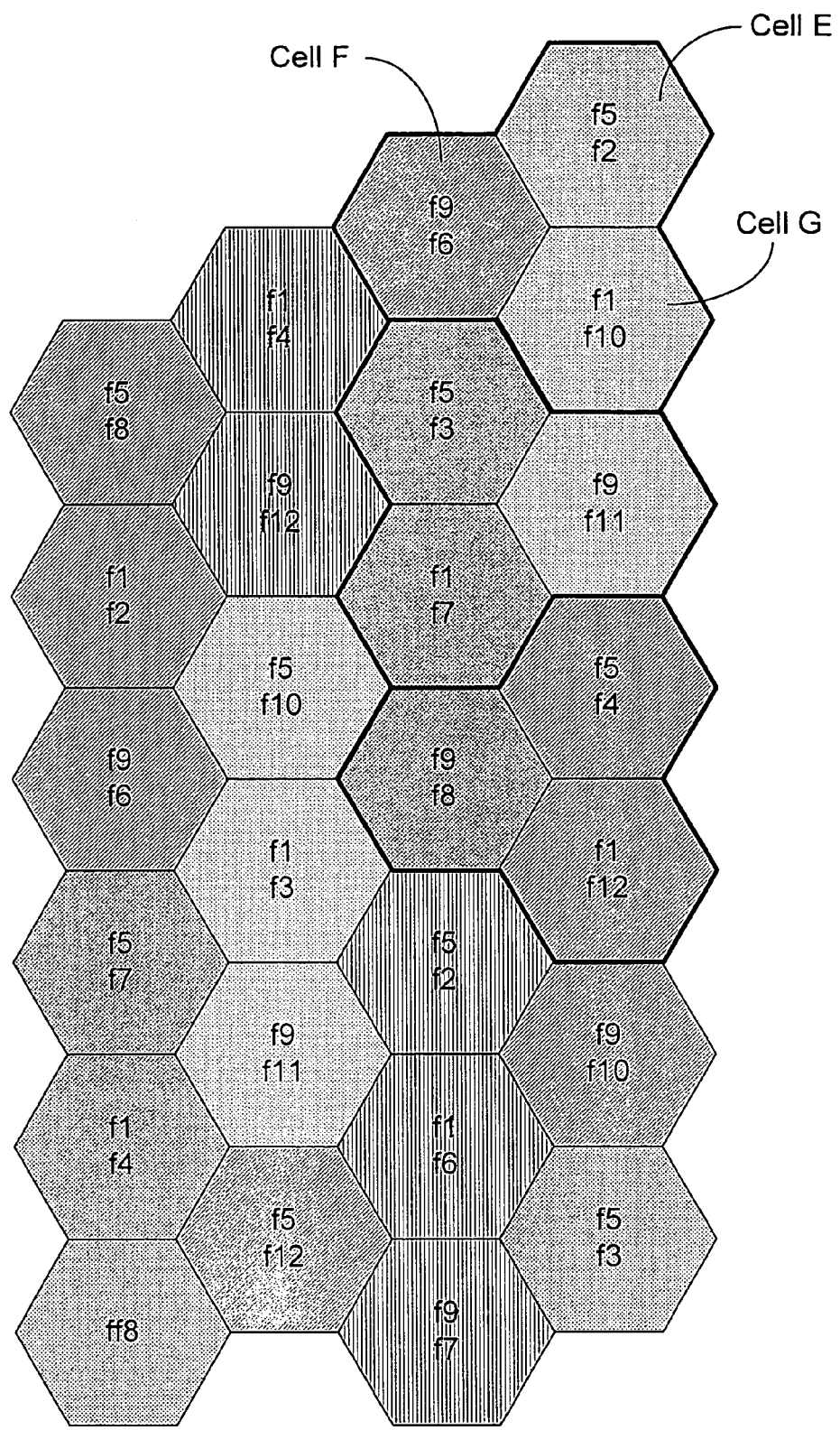
FIG. 12 is a block diagram of the cellular network of FIG. 11 in which the traffic frequencies shown in FIG. 10 have been assigned to respective cells in accordance with an embodiment of the present invention.

FIGS. 13A–13C are traffic frequency assignment charts based on time slot and frame for Cells E through G shown in the cellular network of FIG. 12 and that illustrate exemplary frequency hopping patterns for the cells according to an embodiment of the invention. Essentially, the remaining nine frequencies that are not allocated to the EDGE Compact deployment may be deployed in a 3/9 reuse pattern analogous to the 4/12 reuse pattern discussed hereinabove with respect to FIGS. 6-9. Referring now to FIG. 12, because frequencies f2, f6, and f10 are used solely for traffic, the frequency hopping program module 102 and the frequency hopping synchronization program module 116 may use a cyclical frequency hopping pattern by frame, which is provided by the frequency hopping pattern program module 134 in the base station controller 82. The frequency hopping pattern for a given cell may even include frequencies outside of those defined for the cell's particular frequency reuse group (i.e., outside of frequencies f2, f6, and f10 for Cells E, F, and G). Care should be taken, however, when including frequencies in a frequency hopping pattern that are assigned to more distant cells as it generally more difficult to maintain synchronization between cells as the distance between the cells increases.

The FIG. 12 embodiment may provide enhanced performance over a section of the EDGE frequency spectrum while providing improved spectral efficiency over another section of the EDGE frequency spectrum (i.e., the spectrum allocated to the EDGE Compact deployment). Lower priority traffic may be assigned to the EDGE Compact frequencies because of their lower frequency reuse factor while higher priority traffic may be assigned to the remaining frequencies.

As discussed hereinabove, the present invention stems from the realization that multi-path fading experienced on diverse, non-contiguous frequency bands may be uncorrelated between the respective bands. Consequently, a codeword carried over a plurality of non-contiguous traffic frequencies may be more likely to experience random, uncorrelated fading, which may improve the signal to noise ratio (SNR) of the signal and, as a result, improve network performance.

In accordance with an aspect of the invention, control information may be exchanged during predefined control time slots while traffic information is exchanged during predefined traffic time slots. The predefined traffic time slots may be associated with the plurality of traffic frequencies so as to define a hopping pattern or sequence among the plurality of traffic frequencies. The hopping sequence may be cyclical or random and may be transmitted to the mobile terminal using the control frequency. In particular, the hopping sequence may be transmitted to the mobile terminal using the primary packet broadcast control channel (PB-CCH), which is defined by the control frequency and at least one of the control time slots.

For mobile terminals equipped with only a single frequency synthesizer, at least one idle time slot preferably separates traffic time slots that are associated with different traffic frequencies. Moreover, each of the predefined control time slots is preferably separated from traffic time slots that are associated with a frequency other than the control frequency by at least one idle time slot.

The traffic frequencies are preferably non-contiguous to allow for the encoding of a single code-word over at least a pair of non-contiguous traffic frequencies. For example, using a different traffic frequency in each frame of a radio link control (RLC)/medium access control (MAC) block, which, in a GSM/EDGE network, comprises four time slots spanning four frames, may ensure decorrelation of the fading seen in the four time slots and, further, may reduce the variance of the instantaneous carrier to interference ratio (C/I) by bringing it closer to the average C/I of the channel. As a result, error performance may be sufficiently improved so that real-time services, such as voice, may be delivered over an EDGE network in a more efficient manner.

In accordance with yet another aspect of the invention, an auxiliary cellular communication system may coexist within the same bandwidth defined by the plurality of traffic frequencies. For example, sub-bands associated with an ANSI-136 cellular communication system may be interleaved between sub-bands associated with a GSM/EDGE cellular communication system. Such a frequency distribution may increase the total EDGE communication bandwidth with respect to the coherence bandwidth to increase the likelihood that fading between the EDGE carrier frequencies is uncorrelated.

In accordance with still another aspect of the invention, each of the plurality of traffic frequencies may be associated with an equivalence class of frequencies. A frequency may then be randomly selected from each of the plurality of equivalence classes and these randomly selected frequencies may then be used to communicate traffic information between the mobile terminal and the base station subsystem.

In accordance with yet another aspect of the invention, the plurality of traffic frequencies and the control frequency may be mutually exclusive. For example, the control frequency may be provided through an EDGE Compact deployment in which a plurality of control frequencies are deployed using a low frequency reuse factor (e.g., 1/3 frequency reuse) for improved spectral efficiency. A plurality of traffic frequencies may then be overlaid on the control frequency deployment using a higher frequency reuse factor (e.g., 3/9 frequency reuse). Traffic information may be communicated in each cell by way of frequency hopping among multiple traffic frequencies while control information is communicated over a single control frequency assigned to each cell.

In concluding the detailed description, it should be noted that many variations and modifications can be made to the preferred embodiments without substantially departing from the principles of the present invention. All such variations and modifications are intended to be included herein within the scope of the present invention, as set forth in the following claims.

We claim:

1. A cellular communication system, comprising:
a plurality of base station transceivers;
at least one base station controller that is configured to control the plurality of base station transceivers; and
a cell group that comprises a plurality of cells that are respectively associated with the plurality of base station transceivers and with a plurality of primary frequencies, such that in each of the plurality of cells the respectively associated base station transceiver uses the respectively associated primary frequency to communicate control information, communication of the control information being constrained to the respectively associated primary frequency, and uses coordinated frequency hopping based on a hopping sequence over the plurality of primary frequencies to communicate traffic information;
wherein each of the plurality of cells has predefined control time slots associated therewith that are used to communicate the control information and has predefined traffic time slots associated therewith that are used to communicate the traffic information and at least one defined idle time slot separates at least one of the predefined control time slots from at least one of the predefined traffic time slots, which are associated with different primary frequencies.

2. The cellular communication system as recited in claim 1, wherein the coordinated frequency hopping is cyclical.

3. The cellular communication system as recited in claim 1, wherein the coordinated frequency hopping is random.

4. The cellular communication system as recited in claim 1, wherein the primary frequencies are non-contiguous.

5. The cellular communication system as recited in claim 1, wherein frequencies associated with an auxiliary cellular communication system coexist within a same bandwidth defined by the plurality of primary frequencies.

6. The cellular communication system as recited in claim 5, wherein the primary frequencies are non-contiguous and are each separated, one from another, by at least one of the frequencies associated with the auxiliary cellular communication system.

7. The cellular communication system as recited in claim 1, further comprising:
a global positioning system (GPS) satellite that communicates with the plurality of base station transceivers to synchronize the cellular communication system.

8. A cellular communication system, comprising:
a base station subsystem; and
a mobile terminal that is configured to use a control frequency to exchange control information between the mobile terminal and the base station subsystem, the exchange of control information being constrained to the control frequency, and is configured to use coordinated frequency hopping over a plurality of traffic frequencies to exchange traffic information between the mobile terminal and the base station subsystem;

wherein the base station subsystem is configured to transmit a hopping sequence to the mobile terminal using the control frequency, and wherein the control information is exchanged during predefined control time slots and the traffic information is exchanged during predefined traffic time slots and at least one defined idle time slot separates at least one of the predefined control time slots from at least one of the predefined traffic time slots, which are associated with different frequencies.

9. The cellular communication system as recited in claim 8, wherein the coordinated frequency hopping is cyclical.

10. The cellular communication system as recited in claim 8, wherein the coordinated frequency hopping is random.

11. The cellular communication system as recited in claim 8, wherein the plurality of traffic frequencies and the control frequency are mutually exclusive.

12. The cellular communication system as recited in claim 8, wherein the traffic frequencies are non-contiguous.

13. The cellular communication system as recited in claim 8, wherein frequencies associated with an auxiliary cellular communication system coexist within a same bandwidth defined by the plurality of traffic frequencies.

14. The cellular communication system as recited in claim 13, wherein the traffic frequencies are non-contiguous and are each separated, one from another, by at least one of the frequencies associated with the auxiliary cellular communication system.

15. The cellular communication system as recited in Claim, wherein the plurality of traffic frequencies comprise the control frequency.

16. A method of communication between a mobile terminal and a base station subsystem, comprising:
   assigning a control frequency to a cell in which the mobile terminal is located;
   using the control frequency to exchange control information between the mobile terminal and the base station subsystem, the exchange of control information being constrained to the control frequency;
   assigning a plurality of traffic frequencies to the cell in which the mobile terminal is located;
   transmitting a hopping sequence to the mobile terminal using the control frequency; and
   using coordinated frequency hopping over the plurality of traffic frequencies to exchange traffic information between the mobile terminal and the base station subsystem; and
   wherein the control information is exchanged during predefined control time slots and the traffic information is exchanged during predefined traffic time slots and at least one defined idle time slot separates at least one of the predefined control time slots from at least one of the predefined traffic time slots, which are associated with different frequencies.

17. The method as recited in claim 16, wherein the coordinated frequency hopping is cyclical.

18. The method as recited in claim 16, wherein the coordinated frequency hopping is random.

19. The method as recited in claim 16, wherein transmitting the hopping sequence to the mobile terminal using the control frequency comprises:
   transmitting the hopping sequence to the mobile terminal using a primary packet broadcast control channel (PB-CCH), which is defined by the control frequency and at least one time slot.

20. The method as recited in claim 16, wherein the plurality of traffic frequencies and the control frequency are mutually exclusive.

21. A method of communication between a mobile terminal and a base station subsystem, comprising:
   assigning a control frequency to a cell in which the mobile terminal is located;
   using the control frequency to exchange control information between the mobile terminal and the base station subsystem by encoding a single code-word over at least a pair of the non-contiguous traffic frequencies, the exchange of control information being constrained to the control frequency;
   assigning a plurality of traffic frequencies to the cell in which the mobile terminal is located;
   transmitting a hopping sequence to the mobile terminal using the control frequency; and
   using coordinated frequency hopping over the plurality of traffic frequencies to exchange traffic information between the mobile terminal and the base station subsystem;
   wherein the traffic frequencies are non-contiguous.

22. The method as recited in claim 16, wherein frequencies associated with an auxiliary cellular communication system coexist within a same bandwidth defined by the plurality of traffic frequencies.

23. The method as recited in claim 22, wherein the traffic frequencies are non-contiguous and are each separated, one from another, by at least one of the frequencies associated with the auxiliary cellular communication system.

24. A method of communication between a mobile terminal and a base station subsystem, comprising:
   assigning a control frequency to a cell in which the mobile terminal is located;
   using the control frequency to exchange control information between the mobile terminal and the base station subsystem, the exchange of control information being constrained to the control frequency;
   assigning a plurality of traffic frequencies to the cell in which the mobile terminal is located;
   transmitting a hopping sequence to the mobile terminal using the control frequency;
   using coordinated frequency hopping over the plurality of traffic frequencies to exchange traffic information between the mobile terminal and the base station subsystem;
   assigning an alternative control frequency to the cell in which the mobile terminal is located;
   using the alternative control frequency to exchange control information between the mobile terminal and the base station subsystem, the exchange of control information being constrained to the alternative control frequency;
   assigning a plurality of alternative traffic frequencies to the cell in which the mobile terminal is located; and
   using coordinated frequency hopping over the plurality of alternative traffic frequencies to exchange traffic information between the mobile terminal and the base station subsystem.

25. The method as recited in claim 19, wherein each of the plurality of traffic frequencies is associated with an equivalence class of frequencies and wherein using coordinated frequency hopping over the plurality of traffic frequencies to exchange traffic information between the mobile terminal and the base station subsystem comprises:
   randomly selecting a frequency from each of the plurality of equivalence classes of frequencies; and
   using the randomly selected frequencies to communicate traffic information between the mobile terminal and the base station subsystem.

26. The method as recited in claim 16, wherein the plurality of traffic frequencies comprise the control frequency.

27. A computer program product for facilitating communication between a mobile terminal and a base station subsystem, comprising:
a computer readable storage medium having computer readable program code embodied therein, the computer readable program code comprising:
computer readable program code for assigning a control frequency to a cell in which the mobile terminal is located;
computer readable program code for using the control frequency to exchange control information between the mobile terminal and the base station subsystem, the exchange of control information being constrained to the control frequency;
computer readable program code for assigning a plurality of traffic frequencies to the cell in which the mobile terminal is located;
computer readable program code for transmitting a hopping sequence to the mobile terminal using the control frequency; and
computer readable program code for using coordinated frequency hopping over the plurality of traffic frequencies to exchange traffic information between the mobile terminal and the base station subsystem;
wherein the control information is exchanged during predefined control time slots and the traffic information is exchanged during predefined traffic time slots and at least one defined idle time slot separates at least one of the predefined control time slots from at least one of the predefined traffic time slots, which are associated with different frequencies.

28. The computer program product as recited in claim 27, wherein the coordinated frequency hopping is cyclical.

29. The computer program product as recited in claim 27, wherein the coordinated frequency hopping is random.

30. The computer program product as recited in claim 27, wherein the computer readable program code for transmitting the hopping sequence to the mobile terminal using the control frequency comprises:
computer readable program code for transmitting the hopping sequence to the mobile terminal using a primary packet broadcast control channel (PBCCH), which is defined by the control frequency and at least one time slot.

31. The computer program product as recited in claim 27, wherein the plurality of traffic frequencies and the control frequency are mutually exclusive.

32. A computer program product for facilitating communication between a mobile terminal and a base station subsystem, comprising:
a computer readable storage medium having computer readable program code embodied therein, the computer readable program code comprising:
computer readable program code for assigning a control frequency to a cell in which the mobile terminal is located;
computer readable program code for using the control frequency to exchange control information between the mobile terminal and the base station subsystem, the exchange of control information being constrained to the control frequency;
computer readable program code for assigning a plurality of traffic frequencies to the cell in which the mobile terminal is located;
computer readable program code for transmitting a hopping sequence to the mobile terminal using the control frequency; and
computer readable program code for using coordinated frequency hopping over the plurality of traffic frequencies to exchange traffic information between the mobile terminal and the base station subsystem;
wherein the traffic frequencies are non-contiguous, and wherein the computer readable program code for using the plurality of traffic frequencies to exchange traffic information between the mobile terminal and the base station subsystem comprises:
computer readable program code for encoding a single code-word over at least a pair of the non-contiguous traffic frequencies.

33. The computer program product as recited in claim 27, wherein frequencies associated with an auxiliary cellular communication system coexist within a same bandwidth defined by the plurality of traffic frequencies.

34. The computer program product as recited in claim 33, wherein the traffic frequencies are non-contiguous and are each separated, one from another, by at least one of the frequencies associated with the auxiliary cellular communication system.

35. A computer program product for facilitating communication between a mobile terminal and a base station subsystem, comprising:
a computer readable storage medium having computer readable program code embodied therein, the computer readable program code comprising:
computer readable program code for assigning a control frequency to a cell in which the mobile terminal is located;
computer readable program code for using the control frequency to exchange control information between the mobile terminal and the base station subsystem, the exchange of control information being constrained to the control frequency;
computer readable program code for assigning a plurality of traffic frequencies to the cell in which the mobile terminal is located;
computer readable program code for transmitting a hopping sequence to the mobile terminal using the control frequency;
computer readable program code for using coordinated frequency hopping over the plurality of traffic frequencies to exchange traffic information between the mobile terminal and the base station subsystem;
computer readable program code for assigning an alternative control frequency to the cell in which the mobile terminal is located;
computer readable program code for using the alternative control frequency to exchange control information between the mobile terminal and the base station subsystem, the exchange of control information being constrained to the control frequency;
computer readable program code for assigning a plurality of alternative traffic frequencies to the cell in which the mobile terminal is located; and
computer readable program code for using coordinated frequency hopping over the plurality of alternative traffic frequencies to exchange traffic information between the mobile terminal and the base station subsystem.

36. The computer program product as recited in claim 27, wherein each of the plurality of traffic frequencies is associated with an equivalence class of frequencies and wherein the computer readable program code for using coordinated frequency hopping over the plurality of traffic frequencies to exchange traffic information between the mobile terminal and the base station subsystem comprises:

computer readable program code for randomly selecting a frequency from each of the plurality of equivalence classes of frequencies; and computer readable program code for using the randomly selected frequencies to communicate traffic information between the mobile terminal and the base station subsystem.

37. The computer program product as recited in claim 27, wherein the plurality of traffic frequencies comprise the control frequency.

38. A method of communication between a mobile terminal and a base station subsystem, comprising:

assigning a control frequency to a cell in which the mobile terminal is located;

using the control frequency to exchange control information between the mobile terminal and the base station subsystem, the exchange of control information being constrained to the control frequency;

assigning a plurality of traffic frequencies to the cell in which the mobile terminal is located;

using coordinated frequency hopping over the plurality of traffic frequencies to exchange traffic information between the mobile terminal and the base station subsystem;

assigning an alternative control frequency to the cell in which the mobile terminal is located;

using the alternative control frequency to exchange control information between the mobile terminal and the base station subsystem, the exchange of control information being constrained to the alternative control frequency;

assigning a plurality of alternative traffic frequencies to the cell in which the mobile terminal is located; and using coordinated frequency hopping over the plurality of alternative traffic frequencies to exchange traffic information between the mobile terminal and the base station subsystem.

39. A method of communication between a mobile terminal and a base station subsystem, comprising:

assigning a control frequency to a cell in which the mobile terminal is located;

using the control frequency to exchange control information between the mobile terminal and the base station subsystem, the exchange of control information being constrained to the control frequency;

assigning a plurality of traffic frequencies to the cell in which the mobile terminal is located, each of the plurality of traffic frequencies being associated with an equivalence class of frequencies;

randomly selecting a frequency from each of the plurality of equivalence classes of frequencies; and using the randomly selected frequencies to communicate traffic information between the mobile terminal and the base station subsystem.

\* \* \* \* \*

UNITED STATES PATENT AND TRADEMARK OFFICE
CERTIFICATE OF CORRECTION

PATENT NO. : 7,142,580 B1
APPLICATION NO. : 09/695357
DATED : November 28, 2006
INVENTOR(S) : Balachandran et al.

Page 1 of 1

It is certified that error appears in the above-identified patent and that said Letters Patent is hereby corrected as shown below:

Column 13,
Line 29 should read -- claim 8, wherein the plurality of traffic frequencies comprise --

Column 14,
Line 57 should read -- 25. The method as recited in claim 16, wherein each of the --

Signed and Sealed this

Tenth Day of April, 2007

JON W. DUDAS
*Director of the United States Patent and Trademark Office*